Sept. 22, 1936.　　　J. A. FERGUSON　　　2,055,146
COLLAPSIBLE TAP
Filed March 14, 1935
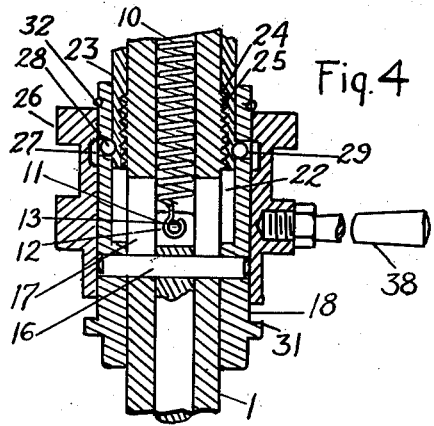
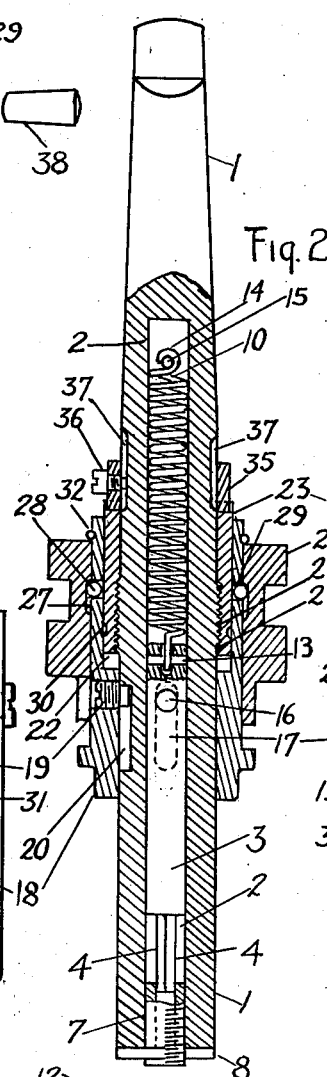
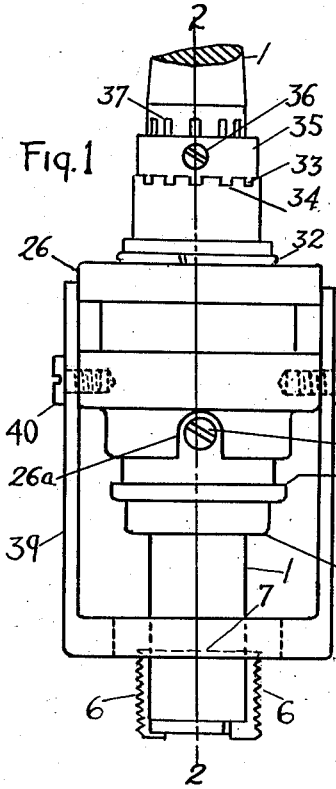
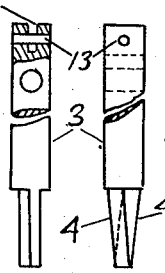
John A. Ferguson
INVENTOR.
BY
ATTORNEYS.

Patented Sept. 22, 1936

2,055,146

UNITED STATES PATENT OFFICE 2,055,146

COLLAPSIBLE TAP

John A. Ferguson, West Millcreek Township, Erie County, Pa., assignor to J. A. Ferguson Company, a copartnership consisting of John A. Ferguson and Charles Asmus, Erie, Pa.

Application March 14, 1935, Serial No. 11,026

8 Claims. (Cl. 10—145)

In the forming of collapsible taps it is desirable to have them so constructed that they may be capable of operating in very small openings. The present invention is designed to accomplish this purpose. It is also desirable to have the operating parts simple and positive in their operation and this is accomplished in the present invention. Features and details of the invention will appear from the specification and claims.

A preferred embodiment of the invention is illustrated in the accompanying drawing as follows:—

Fig. 1 shows a side elevation of the tap with an automatic release yoke thereon.

Fig. 2 a section on the line 2—2 in Fig. 1 with the chasers retracted.

Fig. 3 a similar view with the chasers extended.

Fig. 4 a section on the line 4—4 in Fig. 3.

Fig. 5 an end view of the chasers detached.

Fig. 6 a side view of the chasers detached.

Fig. 7 an end view of the chaser-carrying spindle.

Fig. 8 a side elevation of the chaser actuating cam bar.

Fig. 9 a similar elevation at right angles to that of Fig. 8.

1 marks the spindle which is provided with the usual shank for attachment to a tool. The spindle has a longitudinal opening 2 extending from its working end and an actuating bar 3 is slidingly mounted in the bore 2.

The bar 3 has inclined cammed ribs 4 at its end. These ribs are arranged back to back and form in themselves the entire projecting end of the bar, these cam ribs 4 filling chaser slots 5, 5 in the overlapping faces of chasers 6, the slots 5, 5 being oppositely inclined to correspond to the opposite inclination of the ribs 4. The chasers are mounted in a cross slot 7 at the end of the spindle and are held in place by a cover plate 8 secured on the end of the spindle by screws 9. The bar is yieldingly retracted by a spring 10. This spring has a loop 11 at its end which extends into a slot 12 in the bar and is secured on a pin 13 in the bar. The opposite end of the screw has a loop 14 which engages a pin 15 in the spindle.

A cross pin 16 is arranged in a cross opening in the bar and extends through slots 17 in the spindle into an actuating sleeve 18. A screw 19 extends through the actuating sleeve into a slot 20 and limits the movement of the actuating sleeve in normal operation to a position with the ribs 4 at the extreme outer, or setting position at one extreme and with the ribs practically withdrawn from the slots, but still retaining engagement at the other extreme.

The actuating sleeve has an enlarged opening 22 at its upper end which is slidingly mounted in an adjusting ring 23. The adjusting ring has screw threads 24 operating in screw threads 25 on the spindle so that it may be adjusted along the spindle and thus set the position of the actuating bar at the extreme positions, particularly the setting position.

A controlling sleeve 26 is slidingly mounted on the actuating sleeve 18. It has an annular ball groove 27 which permits of a half entry of a ball 28. The ball 28 operates in an opening 29 in the actuating sleeve. In the position shown in Fig. 2, the ball 28 locks the controlling sleeve and actuating sleeve together. With a downward movement of the controlling sleeve the actuating sleeve is carried with it, thus moving the cross pin 16 and with it the bar, cam ribs and chasers to set position. A ball socket 30 is arranged in the adjusting ring 23 and when the ball 28 reaches this socket it moves into this socket and out of the socket 27. With the ball in the opening 29 and socket 30 the actuating sleeve is locked with the adjusting ring and the chasers are locked in set position. The controlling sleeve can be moved downward after the ball has made the transfer to the socket, thus locking the ball firmly in this socket, the controlling sleeve being finally limited in its movement by contact with the shoulder 31 on the actuating sleeve, this final position being illustrated in Fig. 3. The controlling sleeve is limited in its upward movement by a split ring 32 on the upper end of the actuating sleeve.

The end of the adjusting sleeve is provided with a series of detents 33 locking with detents 34 on a ring 35. The ring 35 is locked with the spindle by means of a screw 36 which enters a longitudinal slot 37. By retracting the ring 35 the adjusting screw may be turned as desired and relocked in its position by the ring 35. These detents are set at pre-determined intervals to give a predetermined advancement of set position for the chasers for an adjustment of each notch.

When it is desired to remove the chasers, the screw 19 is removed, the controlling sleeve 26 being provided with a notch 26a to permit the retraction of the screw. This permits a further upward movement of the actuating sleeve which will withdraw the bar 3 sufficiently to carry the cam ribs out of the cam slots. The controlling ring is, or may be, provided with an operating handle 38 and also may be provided with a trip yoke 39, the sides of which are secured by screws to the controlling ring. This yoke operates in the usual manner, being formed in the path of the work so that as the work advances it will move the controlling ring to a point where it will release the ball and the spring will then retract the parts to release position.

What I claim as new is:—

1. In a collapsible tap, the combination of a hollow spindle having a cross chaser slot; chasers in overlapping relation in said slot having oppositely inclined grooves in adjacent faces of the chasers; a cam bar in the hollow spindle having oppositely inclined cam ribs operating in the cam grooves; and means actuating the bar.

2. In a collapsible tap, the combination of a hollow spindle having a cross chaser slot; chasers in overlapping face to face relation in said slot having oppositely inclined grooves in the overlapped faces; a cam bar in the hollow spindle having back to back oppositely inclined cam ribs operating in the cam grooves; and means actuating the bar.

3. In a collapsible tap, the combination of a hollow spindle having a cross chaser slot therein; chasers in the slot; a cam bar in the spindle actuating the chasers; an actuating sleeve slidingly mounted on the spindle and connected with the bar; and means limiting the movement of the sleeve to retain the engagement of the cam bar with the chasers, said limiting means being movable to permit extended movement of the bar to disengage the chasers.

4. In a collapsible tap, the combination of a hollow spindle having a cross chaser slot therein; chasers in the slot; a cam bar actuating the chasers; an actuating sleeve on the spindle connected with the bar; a controlling sleeve on the actuating sleeve; and locking means between the control sleeve and the actuating sleeve and between the actuating sleeve and the spindle locking the control and actuating sleeves together with the actuating sleeve away from set position and releasing the control sleeve from the actuating sleeve and locking the actuating sleeve with the spindle at set position.

5. In a collapsible tap, the combination of a hollow spindle having a cross chaser slot therein; chasers in the slot; a cam bar actuating the chasers; an actuating sleeve on the spindle connected with the bar; a controlling sleeve on the actuating sleeve; and locking means between the control sleeve and the actuating sleeve and between the actuating sleeve and the spindle locking the control and actuating sleeves together with the actuating sleeve away from set position and releasing the control sleeve from the actuating sleeve and locking the actuating sleeve with the spindle at set position, said means permitting added movement of the control sleeve to set the lock between the actuating sleeve and the spindle.

6. In a collapsible tap, the combination of a hollow spindle having a cross chaser slot therein; chasers in the slot; a cam bar actuating the chasers; an actuating sleeve on the spindle connected with the bar; a controlling sleeve on the actuating sleeve; an adjusting ring on the spindle; and locking means between the controlling sleeve and the actuating sleeve and between the actuating sleeve and the adjusting ring locking the controlling sleeve and actuating sleeve together with the actuating sleeve away from set position and releasing the controlling sleeve from the actuating sleeve and locking the actuating sleeve with the adjusting ring with the actuating sleeve in set position.

7. In a collapsible tap, the combination of a hollow spindle having a cross chaser slot therein; chasers in the slot; a cam bar actuating the chasers; an actuating sleeve on the spindle connected with the bar; a controlling sleeve on the actuating sleeve; an adjusting ring on the spindle; locking means between the controlling sleeve and the actuating sleeve and between the actuating sleeve and the adjusting ring locking the controlling sleeve and actuating sleeve together with the actuating sleeve away from set position and releasing the controlling sleeve from the actuating sleeve and locking the actuating sleeve with the adjusting ring with the actuating sleeve in set position; means for adjusting the actuating ring comprising a screw-threaded connection between the ring and spindle; and means for locking the ring in adjusted position.

8. In a collapsible die, the combination of a hollow spindle; chasers in overlapping relation at the end of the spindle, said chasers having oppositely inclined grooves in adjacent faces, the cutting faces of the chasers being in the same diametrical plane; a cam bar mounted in the spindle and having oppositely inclined cam ribs operating in the cam grooves; and means actuating the cam bar.

JOHN A. FERGUSON.